United States Patent
Feng et al.

(10) Patent No.: US 9,958,559 B1
(45) Date of Patent: May 1, 2018

(54) METHOD AND APPARATUS FOR AUTOMATIC DETECTION AND CORRECTION OF PATIENT BED SHIFT USING INTRINSIC SCINTILLATION CRYSTAL RADIATIONS

(71) Applicant: UIH AMERICA, INC., Houston, TX (US)

(72) Inventors: Tao Feng, Houston, TX (US); Hongdi Li, Houston, TX (US)

(73) Assignee: UIH AMERICA, INC., Houston, TX (US)

( * ) Notice: Subject to any disclaimer, the term of this patent is extended or adjusted under 35 U.S.C. 154(b) by 0 days. days.

(21) Appl. No.: 15/646,173

(22) Filed: Jul. 11, 2017

(51) Int. Cl.
*G01T 1/29* (2006.01)

(52) U.S. Cl.
CPC .......... *G01T 1/2907* (2013.01); *G01T 1/2978* (2013.01); *G01T 1/2985* (2013.01)

(58) Field of Classification Search
CPC .... G01T 1/2907; G01T 1/2978; G01T 1/2985
See application file for complete search history.

(56) References Cited

U.S. PATENT DOCUMENTS

| | | | |
|---|---|---|---|
| 9,507,033 | B2 | 11/2016 | Rothfuss et al. |
| 2014/0217294 | A1 | 8/2014 | Rothfuss et al. |
| 2015/0327816 | A1 * | 11/2015 | Kakinuma ............ A61B 6/027 378/20 |
| 2017/0164911 | A1 * | 6/2017 | Lv ......................... A61B 6/037 |

* cited by examiner

*Primary Examiner* — Mark R Gaworecki
(74) *Attorney, Agent, or Firm* — Metis IP LLC

(57) ABSTRACT

The disclosure relates to a system and method for determining a working bed location. The method may include: acquire a first reference bed location relating to a bed for supporting an object; acquire a first set of reference emission data relating to photons of a first energy level originated from radiation of scintillator crystals of a plurality of detectors, the first set of reference emission data corresponding to the first reference bed location; acquire, at a working bed location relating to the bed, a set of positioning emission data relating to photons of the first energy level, wherein the set of positioning emission data relating to photons of the first energy level originated from radiation of scintillator crystals of the plurality of detectors; and determine the working bed location based on the first reference bed location, the first set of reference emission data, and the set of positioning emission data.

20 Claims, 11 Drawing Sheets

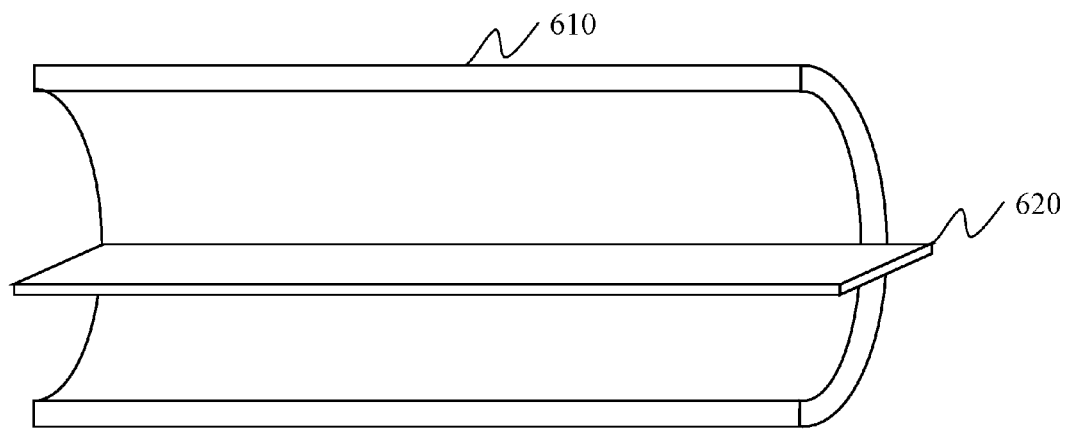
FIG. 6-A
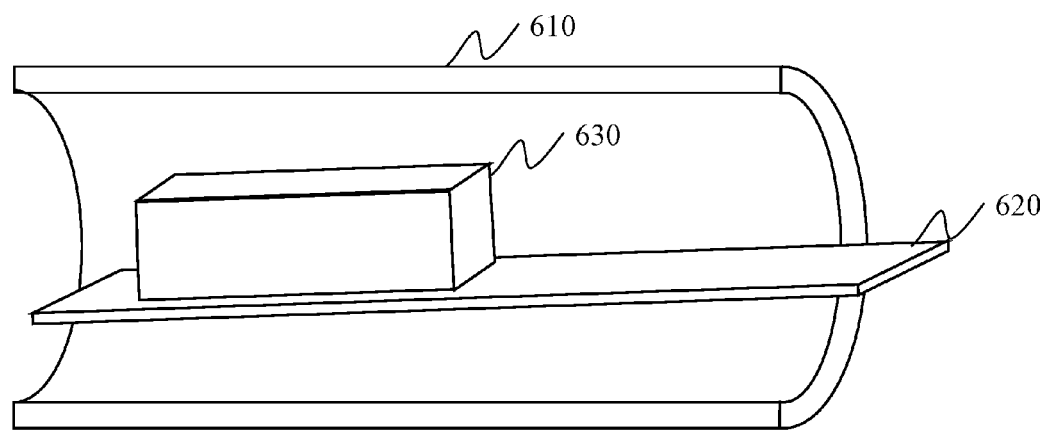
FIG. 6-B

METHOD AND APPARATUS FOR AUTOMATIC DETECTION AND CORRECTION OF PATIENT BED SHIFT USING INTRINSIC SCINTILLATION CRYSTAL RADIATIONS

TECHNICAL FIELD

The present disclosure generally relates to PET, and more specifically relates to method and apparatus for automatic detection and correction of patient bed shift using intrinsic scintillation crystal radiations.

BACKGROUND

Imaging methods including, Positron Emission Tomography (PET), Computed Tomography (CT), Single Photon Emission Computed Tomography (SPECT), and Magnetic Resonance Imaging (MRI) have been widely used in medical diagnosis. An object, such as a patient, may be scanned with a PET system to obtain PET data. The object may be support by a bed during the scan, deforming the bed from its original location to an unknown new location. There is a need for a system and method to determine the unknown bed location.

SUMMARY

In a first aspect of the present disclosure, a system for determining a working bed location is provided. The system may include at least one storage medium and at least one processor. The at least one storage medium may include a set of instructions. The at least one processor may be configured to communicate with the at least one storage medium, wherein when executing the set of instructions, the system is configured to perform one or more of the following operations. A first reference bed location relating to a bed for supporting an object may be acquired. A first set of reference emission data relating to photons of a first energy level originated from radiation of scintillator crystals of a plurality of detectors may be acquired. The first set of reference emission data may correspond to the first reference bed location. A set of positioning emission data relating to photons of the first energy level may be acquired at a working bed location relating to the bed. The set of positioning emission data relating to photons of the first energy level originated from radiation of scintillator crystals of the plurality of detectors. The working bed location may be determined based on the first reference bed location, the first set of reference emission data, and the set of positioning emission data.

In some embodiments, the scintillator crystals of the plurality of detectors may include Lu-176.

In some embodiments, the first energy level may include 202 keV or 307 keV.

In some embodiments, the system may be configured to acquire a set of working emission data including the set of positioning emission data and a set of imaging emission data at the working bed location. The set of imaging emission data may relate to photons originated from annihilation events within the object located within a detecting region of the system.

In some embodiments, the system may be configured to determine a bed shift from a set-up bed location of the determined working bed location. The bed shift may be in an image domain.

In some embodiments, the system may be further configured to operate one or more of the following operations. A PET image may be generated based on the set of imaging emission data. A CT image related to the object may be obtained. The CT image may be aligned with the PET image based on the determined bed shift, to generate an aligned CT image. An attenuation map for the PET image may be generated based on the aligned CT image.

In some embodiments, the system may be further configured to operate one or more of the following operations. A CT image related to the object may be obtained. An attenuation map may be generated based on the CT image. A projection equation may be used to transform the bed shift from the image domain to a sinogram domain. The set of imaging emission data may be corrected based on the transformed bed shift, to generate a set of corrected imaging emission data. An attenuation corrected PET image may be generated from the corrected imaging emission data, according to the attenuation map.

In some embodiments, the system may be further configured to model the bed shift in an imaging reconstruction with a CT-based attenuation map.

In some embodiments, the system may be configured to operate one or more of the following operations. A second reference bed location relating to the bed may be determined. A second set of reference emission data relating to photons of the first energy level originated from radiation of the scintillator crystals of the plurality of detectors may be acquired. The second set of reference emission data corresponding to the second reference bed location.

In some embodiments, the system may be further configured to determine the similarity between the set of positioning emission data and at least one of the first set of reference emission data and the second set of reference emission data.

In some embodiments, the system may be configured to operate one or more of the following operations. A first sinogram may be generated based on the first set of reference emission data. A second sinogram may be generated based on the second set of reference emission data. A third sinogram may be generated based on the set of positioning emission data. A similarity between the third sinogram and at least one of the first sinogram and the second sonogram may be determined. The working bed location may be determined based on the determined similarity.

In some embodiments, the system may be further configured to obtain a library of reference information including reference bed locations and corresponding plurality sets of reference emission data, the reference information including the first reference bed location, the first set of reference emission data, the second reference bed location, and the second set of reference emission data.

In some embodiments, the system may be further configured to determine a relationship of the first reference bed location, the first set of reference emission data, the second reference bed location, and the second set of reference emission data.

In some embodiments, the system may be further configured to determine the similarity between the third sinogram and at least one of the first sinogram and the second sinogram.

In some embodiments, the object is placed on the bed when the first set of reference emission data is acquired and when the set of positioning emission data are acquired.

In some embodiments, the system may be further configured to correct the set of positioning emission data based on a third set of emission data relating to photons of a second energy level originated from an annihilation event within the object located in a detecting region of the system.

In some embodiments, the second energy level may include 511 keV.

In a second aspect of the present disclosure, a method for operating an imaging system is provided. The imaging system may include a positron emission tomography (PET) scanner. The PET scanner may include a bed being positioned within a bore of a detector assembly. The detector assembly may include a plurality of scintillator crystals enclosing the bore thereamong. The method may include one or more of the following operations. A plurality of reference sinograms may be obtained. The plurality of reference sonograms may be acquired based on blank scan data corresponding to a first energy level. The blank scan data originate from intrinsic background radiation of the plurality of scintillator crystals at a plurality of predetermined bed locations of the bed on which a nonradioactive phantom of a first weight is placed. Each of the plurality of reference sinograms may correspond to one of the plurality of predetermined bed locations. Emission data of gamma photons of multiple energy levels originating from intrinsic background radiation, and annihilation events associated with radioactivity of a patient on the bed may be acquired. Emission data relating to the intrinsic background radiation may be differentiated from emission data from the radioactivity from the patient from the acquired emission data of gamma photons of multiple energy levels. A measured sinogram may be generated based on the differentiated emission data relating to the intrinsic background radiation. A bed shift of the bed may be determined by comparing the measured sinogram with the plurality of reference sinograms.

In some embodiments, the measured sinogram may be compensated by removing scattering or random coincidence factors therein.

In some embodiments, energy level and TOF timing differentiation may be used to differentiate the emission data from the radioactivity from the patient.

In some embodiments, the method may include one or more of the following operations. A PET image may be generated based on the emission data relating to the radioactivity of the patient. A CT image related to the patient may be obtained, the CT image being generated by using the CT scanner. A mismatch between the CT image and the PET image may be adjusted based on the determined bed shift. An attenuation map for the PET image may be generated based on the aligned CT image.

In a third aspect of the present disclosure, an imaging system is provided. The imaging system may include a positron emission tomography (PET) scanner. The positron emission tomography (PET) scanner may include a detector assembly including a plurality of scintillator crystals, a bed adapted to be accommodated in a bore enclosed by the plurality of scintillator crystals, at least one storage medium including a set of instructions, and at least one processor configured to communicate with the at least one storage medium, wherein when executing the set of instructions, the system may be configured to operate one or more of the following operations. A plurality of reference sinograms may be obtained. The plurality of reference sonograms may be acquired generated based on the blank scan data corresponding to a first energy level. The blank scan data originate from intrinsic background radiation of the plurality of scintillator crystals at a plurality of predetermined bed locations of the bed on which a nonradioactive phantom of a first weight is placed. Each of the plurality of reference sinograms may correspond to one of the plurality of predetermined bed locations. Emission data of gamma photons of multiple energy levels originating from intrinsic background radiation, and annihilation events associated with radioactivity of a patient on the bed may be acquired. Emission data relating to the intrinsic background radiation may be differentiated from emission data from the radioactivity from the patient. A measured sinogram may be generated based on the differentiated emission data relating to the intrinsic background radiation. A bed shift may be determined by comparing the measured sinogram with the plurality of reference sinograms.

In some embodiments, the system may further include a computed tomography (CT) scanner, and a computer operationally coupled the PET scanner and the CT scanner. The computer may be configured to operate one or more of the following operations. A PET image may be generated based on emission data relating to the radioactivity of the patient. A CT image related to the patient may be obtained. The CT image may be aligned with the PET image based on the determined bed shift to generate an aligned CT image. An attenuation map for the PET image may be generated based on the aligned CT image.

In some embodiments, the system may be configured to generate an attenuation corrected PET image based on the attenuation map and the PET image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 6-A and FIG. 6-B are exemplary diagrams illustrating a bed location according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by other expression if they achieve the same purpose.

Figure 2:
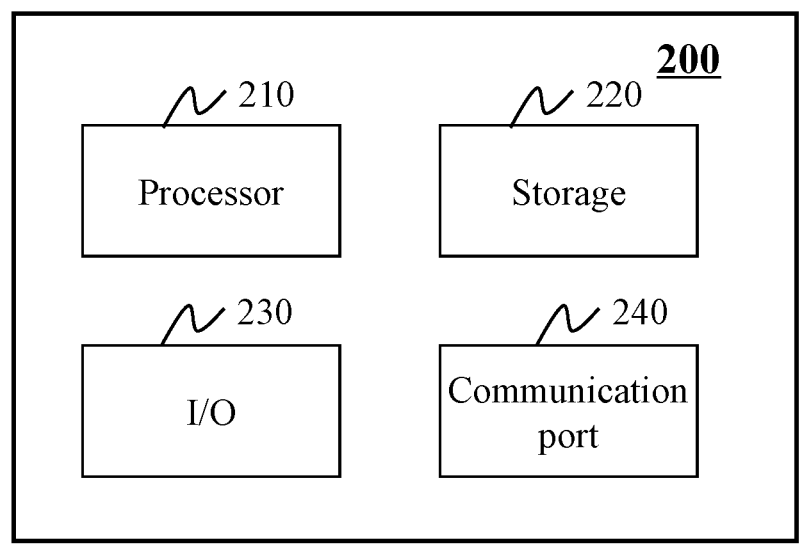
FIG. 2 is a schematic diagram illustrating exemplary hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and components for non-invasive imaging, such as for disease diagnosis or research purposes. In some embodiments, the imaging system may be a positron emission tomography (PET) system, a single photon emission computed tomography (SPECT) system, a computed tomography (CT) system, a digital radiography (DR) system, a multi-modality system, or the like, or any combination thereof. Exemplary multi-modality system may include a computed tomography-positron emission tomography (CT-PET) system, etc.

For illustration purposes, the disclosure describes systems and methods for determining a bed location in the PET image reconstruction. In some embodiments, the system may further correct a PET image based on the determined bed location.

As used herein, a bed location may refer to a spatial location of the bed, including a deformation (e.g., a sag) of the bed that may be caused by, for example, an object supported on the bed. The object may cause a deformation of the bed due to, for example, the weight of the object, and/or the location of the object on the bed, the distribution of weight of the object, or the like, or a combination thereof.

The term "image" used in this disclosure may refer to a 2D image, a 3D image, a 4D image, and/or any related image data (e.g., PET data, emission data corresponding to the PET data). It should be noted that in this disclosure, the terms "image data" and "image" may be used interchangeably. This is not intended to limit the scope the present disclosure. For persons having ordinary skills in the art, a certain amount of variations, changes, and/or modifications may be deducted under the guidance of the present disclosure.

The term "radiation" used herein may include a particle radiation, a photon radiation, or the like, or any combination thereof. The particle may include a positron, a neutron, a proton, an electron, a k-meson, a heavy ion, or the like, or any combination thereof. The photon may include a gamma photon, an, a beta photon, an X-ray photon, or the like, or any combination thereof. Those variations, changes, and/or modifications do not depart from the scope of the present disclosure.

Figure 1:
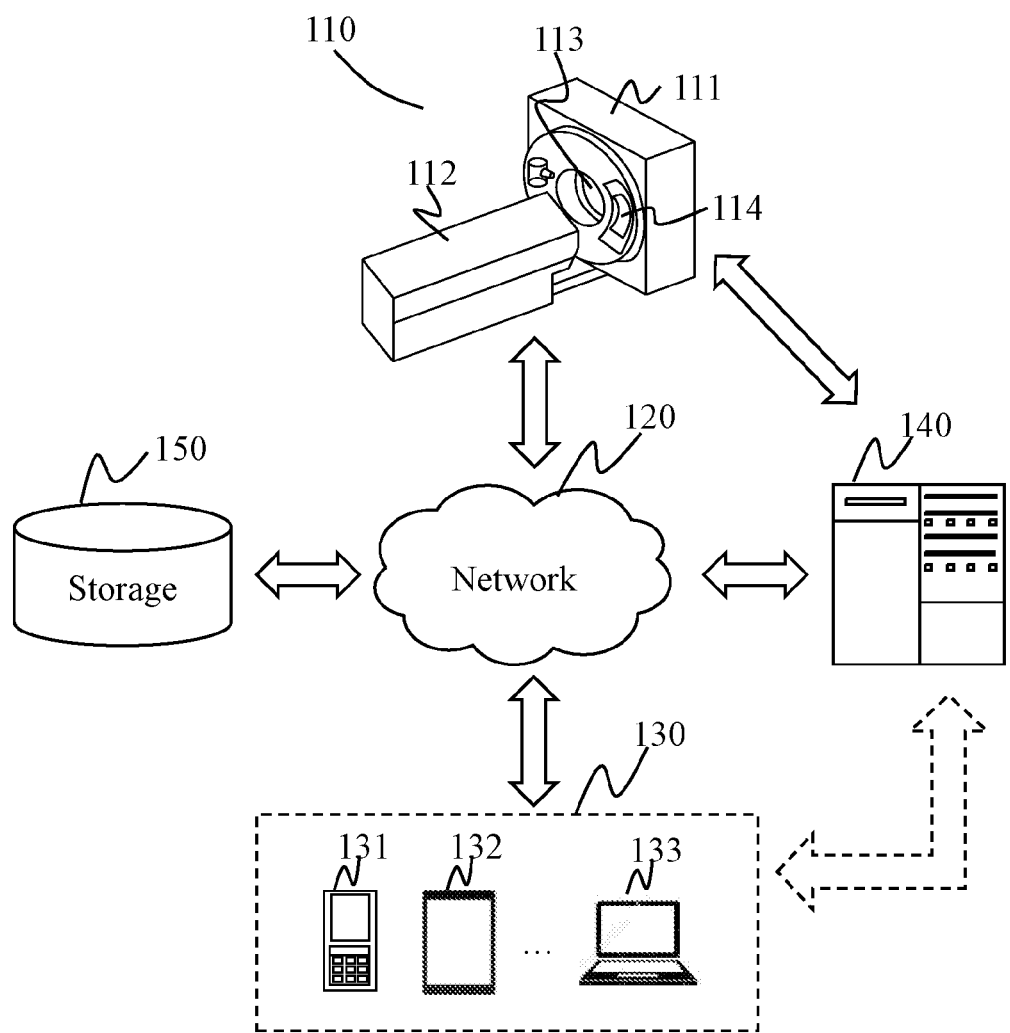
FIG. 1 is a schematic diagram illustrating an exemplary PET system according to some embodiments of the present disclosure.

FIG. 1 is a schematic diagram illustrating an exemplary PET system 100 according to some embodiments of the present disclosure. As shown, the PET system 100 may include a PET scanner 110, a network 120, one or more terminals 130, a processing engine 140, and a storage 150.

The PET scanner 110 may include a gantry 111, a bed 112, a detecting region 113, and a detector block 114. The gantry 111 may support the detector block 114. The bed may be positioned within a bore of the detector block 114. Specifically, the bed 112 may be adapted to be accommodated in a bore enclosed by the plurality of scintillator crystals of the detector block 114.

The bed 112 may support an object or a patient (not shown) for scanning. The object may be biological or non-biological. Merely by way of example, the object may include a patient, a human-made object, etc. When an object is supported by a bed, the bed 112 may be at a bed location due to deformation or sag. The deformation may depend on various factors including, for example, the weight of the object being supported on the bed, the location of the object on the bed, the distribution of weight of the object, or the like, or a combination thereof. Merely by way of example, a bed location may be described relative to the gantry 111 of the PET system 100 in a certain direction. The certain direction may include, for example, an X direction, a Y direction, and/or a Z direction. As used herein, the X direction, the Y direction, and the Z direction may represent an X axis, a Y axis, and a Z axis in a coordinate system. Merely by way of example, the X axis and the Z axis may be in a horizontal plane, the X axis and the Y axis may be in a vertical plane, the Z axis may be along the rotational axis of the gantry 111.

As used herein, a reference bed location may include a location of the bed 112 during a reference scan when an object is supported on the bed. As used herein, a working bed location may include a location of the bed 112 during a working scan. As used herein, a reference scan may refer to a scan in which an object is scanned to provide reference information. In some embodiments, such reference information may be used in future working scans. As used herein, a working scan may refer to a scan in which an object (e.g., a patient) is scanned for, e.g., diagnostic purposes. In some embodiments, the reference information acquired in a reference scan may be used to determine a parameter (e.g., a working bed location) related to a working scan. For example, a working bed location may be determined based on the working emission data, reference emission data, and the correspondence of the reference emission data and the reference bed location(s), etc., for there is a relationship between bed location and the emission data acquired at the bed location. The acquired emission data may include sinogram.

An exemplary relationship between the bed location and the corresponding sinogram is illustrated here. The bed causes attenuation in background radiation. Let b(x,y,z) be the 3D attenuation map of the bed. (x,y,z) may denote three-dimensional coordinate of a voxel in the plurality of regions. x may denotes x-axis coordinate. y may denote y-axis coordinate. z may denote z-axis coordinate. For a fixed location z, the total attenuation caused by the bed may be expressed as $$a(s,\varphi)=\int b(x,y,z)\delta(x\cos(\varphi)+y\sin(\varphi)-s)dxdy, \quad (1)$$

where δ may be the Dirac delta function, s may correspond to the distance along the imaging plane perpendicular to the scanner axis, and φ may correspond to the angle of the detector plane with respect to the x axis in (x, y) coordinate space (in other words, φ corresponds to a particular LOR direction). With the added moment w, (moment=weight*the location of the center of mass along the z axis), the location of the bed may be shifted along the y direction. The new attenuation map of the bed may become:

$$b(x,y+w\cdot r(z),z), \quad (2)$$

where w may be the moment, and r(z) may be the moment-shift response function of the bed. The r(z) may describe how the bed shifts when there is a moment applied on the bed. If the bed is rigid, $$r(z)=\alpha z, \quad (3)$$

where the shape of r(z) and the value of α are pre-calibrated.

The total attenuation caused by the bed for a fixed location z $$a(s,\varphi,w)=\int b(x,y+w\cdot r(z),z)\delta(x\cos(\varphi)+y\sin(\varphi)-s)dxdy, \quad (4)$$

Its relationship with the original attenuation caused by the bed is $$a(s,\varphi,w)=\int b(x,y,z)\delta(x\cos(\varphi)+(y-w\cdot r(z))\sin(\varphi)-s)$$
$$dxdy=\int b(x,y,z)\delta(x\cos(\varphi)+y\sin(\varphi)-(w\cdot r(z))\sin$$
$$(\varphi)+s))dxdy=a((w\cdot r(z))\sin(\varphi)+s,\varphi) \quad (5)$$

The reference emission sinogram (RS) is equal to a flood map attenuated by the bed attenuation, $$RS(s,\varphi)=\exp(-a(s,\varphi,w)), \quad (6)$$

An object used in a reference scan may include a patient, a phantom, a human-made object, etc. In some embodiments, an object used in a reference scan does not emit photons or other signals that are detectable by the PET scanner 110. In other words, the object used in the reference scan may be nonradioactive. An object used in a working scan may include a patient. In some embodiments, an object used in a working scan emits photons or other signals that are detectable by the PET scanner 110. Emission data relating to such photons or other signals originated from the object in a working scan may be substantially removed from the corresponding working emission data relating to the working bed location. Merely by way of example, in a working scan, patient also generates radiation events and could potentially affects the measurement. Let the patient activity distribution be f(x,y,z), the affected sinogram is:

$$A(s,\varphi)=\int f(x,y,z)\delta(x\cos(\varphi)+y\sin(\varphi)-s)dxdy, \quad (7)$$

only unaffected areas are used in the determination $$RS(s,\varphi)=\begin{cases} \exp(-a(s,\varphi,w)), & A(s,\varphi)=0 \\ 0, & \text{otherwise} \end{cases}, \quad (8)$$

In some embodiments, the reference information may include a plurality of pre-determined bed locations (or referred to as reference bed locations), and corresponding reference emission data. Merely by way of example, the reference bed location may include a first reference bed location and a second reference bed location. In some embodiments, reference information may be determined before a working scan. For example, the reference information may be determined during reference scans. Multiple objects or phantoms may be used to perform the reference scans. These objects may have different features including, for example, weight, a weight distribution along a direction (e.g., in the z-direction along which the PET scanner 110 moves into or out of the gantry 111), or the like, or a combination thereof. Such objects may mimic the situations in which patients of different features are supported on the bed for scans to be performed. In a reference scan, an object may be placed on the bed, and a scan may be performed to acquire corresponding reference emission data. In some embodiments, the reference bed locations may be determined by a measuring device. Merely by way of example, the measuring device may include a ruler, a laser, and/or a sensor (e.g., a distance measurement sensor, a camera, etc.).

The detector block 114 may detect emission data relating to photons. The photons may include a gamma photon, an x-ray photon, or the like, or any combination thereof. In some embodiments, the detector block 114 may include one or more detector units. A detector unit may detect emission data relating to photons emitted from the detector unit itself and/or from an object, or a portion thereof, located in the detecting region 113.

The detector block 114 may detect or collect reference emission data. The detector block 114 may collect a plurality sets of reference emission data at a plurality of bed locations. In some embodiments, as described in connection with the bed 112. Multiple objects or phantoms may be used to perform the reference scans to generate reference emission data. These objects may have different features including, for example, weight, a weight distribution along a direction (e.g., in the z-direction along which the PET scanner 110 moves into or out of the gantry 111), or the like, or a combination thereof. Merely by way of example, a plurality of objects with different weight may be scanned respectively, to trigger the bed to be located in a plurality of bed locations. The detector block 114 may collect a plurality sets of reference emission data at the plurality of bed locations. In some embodiments, a certain object with a certain weight may be placed on different positions on the bed, resulting different the bed to be located in different bed locations. The detector block 114 may collect a plurality sets of reference emission data at the plurality of bed locations. In some embodiments, the reference emission data contain the detector detected emission data relating to photons emitted from the detector unit itself. The photons may correspond to a radiation event (e.g., a beta decay) originated from the detector unit. Merely by way of example, the scintillator crystal of the detector unit may include Lu-176. The Lu-176 may emit multiple photons or beta particle as a result of beta decay. The photons emitted by the detector unit may be of a first energy level. The first energy level may include 202 KeV and/or 307 KeV. The photons and beta particles emitted by the detector unit may impinge on two detector units, the line of response (LOR) of this event may be determined by setting the coincidence window with a timing delay corresponding to the distance of the two detector units The LOR along which the radiation event originated from the detector unit has occurred may also be referred to as a background LOR.

In some embodiments, the detector 114 may detect emission data relating to photons emitted from an object, or a portion thereof, located in the detecting region 113. For example, the photons may correspond to an annihilation event (e.g., a positron annihilation event) occurred within the object. The object may emit photons as a result of the annihilation event. The photons resulting from the annihilation event may be of a second energy level. The second energy level may be different from the first energy level. For instance, the first energy level is 202 KeV and/or 307 KeV, while the second energy level is 511 KeV. The two photons may impinge on two detector units of the detector 114, which may identify a line of response (LOR) along which the annihilation event has occurred. As used herein, the LOR along which the annihilation event has occurred may also be referred to as an imaging LOR.

The detector 114 may detect emission data relating to photons (e.g., gamma photons, x-ray photons, etc.) in a reference scan and/or a working scan. As used herein, a reference scan may refer to a scan in which an object is scanned to provide reference information. In some embodiments, such reference information may be used in future working scans. In some embodiments, an object used in a reference scan may include a patient, a phantom, a human-made object, etc. As used herein, a working scan may refer to a scan in which an object is scanned for, e.g., diagnostic purposes. In some embodiments, an object used in a reference scan may include a patient. The emission data relating to photons detected in the reference scan may be referred to as self-emission data (or referred to as reference emission data or blank scan data). The photons corresponding to the reference emission data may be of the first energy level. The emission data relating to photons detected in the working scan may be referred to as working emission data. The photons corresponding to the working emission data may be of the first energy level and/or the second energy level. In some embodiments, the working emission data relating to photons of the first energy level may be referred to as positioning emission data. The positioning emission data may correspond to the intrinsic background radiation of the detector block 114. The working emission data relating to photons of the second energy level may be referred to as imaging emission data.

In some embodiments, the detector block 114 may detect a plurality of sets of reference emission data relating to photons at a plurality of reference bed locations. Merely by way of example, the detector block 114 may detect a first set of reference emission data at a first reference bed location, and a second set of reference emission data at a second reference bed location, respectively. As another example, the detector block 114 may detect a set of working emission data at the working bed location in a working scan.

In some embodiments, the detector block 114 may include one or more detector units. A detector unit may include a scintillation detector (e.g., a cesium iodide detector), a gas detector, etc. The detector block 114 may be and/or include a single-row detector and/or a multi-row detector. In some embodiments, the detector block 114 may further send the detected emission data to the processing engine 140.

The network 120 may include any suitable network that can facilitate exchange of information and/or data (e.g., emission data) for the PET system 100.

In some embodiments, one or more components of the PET system 100 (e.g., the PET scanner 110, the terminal 130, the processing engine 140, the storage 150, etc.) may communicate information and/or data with one or more other components of the PET system 100 via the network 120. For example, the processing engine 140 may obtain emission data from the PET scanner 110 via the network 120. As another example, the processing engine 140 may obtain user instructions from the terminal 130 via the network 120.

The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the PET system 100 may be connected to the network 120 to exchange data and/or information.

The terminal(s) 130 may include a mobile device 131, a tablet computer 132, a laptop computer 133, or the like, or any combination thereof. In some embodiments, the mobile device 131 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 130 may be part of the processing engine 140.

The processing engine 140 may process data and/or information obtained from the PET scanner 110, the terminal 130, and/or the storage 150. Merely by way of example, the processing engine 140 may process the emission data (e.g., the reference emission data, the working emission data, etc.) transmitted from the detector block 114 of the PET scanner 110.

In some embodiments, the processing engine 140 may extract positioning emission data from acquired working emission data. As illustrated in connection with the detector block 114, the working emission data may include positioning emission data and imaging emission data. The positioning emission data may be of photons of a first energy level (e.g., 202 KeV, or 307 KeV). The imaging emission data may be of photons of a second energy level (e.g., 511 KeV) different from the first energy level. Merely by way of example, the processing engine 140 may extract from the working emission data the positioning emission data corresponding to radiation events. The extraction may be performed based on the signals received by the detector block 114 including the detected energy level, the time-of-flight, or the like, or a combination thereof.

Likewise, the processing engine 140 may determine a certain portion of working emission data to be the imaging emission data corresponding to annihilation events. The processing engine 140 may determine the working emission data to be corresponding to an annihilation event and/or a radiation event based on the time-of-flight and/or energy of the detected emission.

In some embodiments, the processing engine 140 may determine the working emission data to correspond to an annihilation event and/or a radiation event based at least partially on the time-of-flight of the detected emission. Merely by way of example, the processing engine 140 may determine the working emission data to correspond to an annihilation event when the time-of-flight for its corresponding emission is within in a first time window. The first time window may range from, for example, 1.8 nanoseconds to 2.2 nanoseconds. As another example, the processing engine 140 may determine the working emission data to correspond to a radiation event when the time-of-flight for its corresponding emission is within a second time window. The second time window may range from, for example, 18 nanoseconds to 22 nanoseconds.

In some embodiments, the processing engine 140 may determine the working emission data to correspond to an annihilation event and/or a radiation event based on the energy of the detected emission. Merely by way of example, the processing engine 140 may determine the working emission data corresponding to photons of an energy centered around a first energy level (e.g., 307 or 202 KeV) to correspond to a radiation event. As another example, the processing engine 140 may identify the working emission data corresponding to photons of an energy centered around a second energy level (e.g., 511 KeV) to correspond to an annihilation event.

In some embodiments, the processing engine 140 may obtain emission data of gamma photons of multiple energy levels originating from intrinsic background radiation and annihilation events associated with radioactivity of a patient on the bed. The processing engine 140 may differentiate emission data relating to the intrinsic background radiation from emission data from the radioactivity from the patient. In some embodiments, the differentiating the emission data from the radioactivity from the patient may comprise: calculating an expected TOF (time of flight) for each detected gamma photon, measuring a TOF for each detected gamma photon; computing a time difference between the expected TOF and the measured TOF for each detected gamma photon, to yield a plurality of time differences; computing a histogram of the plurality of time differences; if the time difference of a gamma photon of the plurality of gamma photons is satisfied, the gamma photon may be related to emission data relating to the intrinsic background radiation; otherwise, the gamma photon may be related to emission data from the radioactivity from the patient.

In some embodiments, the processing engine 140 may extract the positioning emission data from the working emission data. For example, the processing engine 140 may extract the positioning emission data by filtering out the imaging emission data from the working emission data. Specifically, the processing engine 140 may differentiate the emission data of gamma photons of the multiple energy levels originating from intrinsic background radiation from the radioactivity of a subject (e.g., a patient).

In some embodiments, the processing engine 140 may process reference emission data (e.g., a first set of reference emission data), reference bed locations corresponding to the reference emission data (e.g., a first reference bed location corresponding to the first set of reference emission data), and the positioning emission data to determine the working bed location (or the bed shift or bed subsidence from the corresponding set-up bed location of the working bed location). The set-up bed location corresponding to the working bed location may refer to the bed location the PET system 100, not including the bed shift (bed displacement) that may be introduced by, for example, the weight of the subject being placed on the bed 112.

In some embodiments, the processing engine 140 may process the emission data (e.g., reference emission data, positioning emission data, etc.) to generate sinograms. The processing engine 140 may generate a plurality of reference sinograms based on emission data (or referred to as blank scan data). Each of the plurality of reference sinograms may correspond to one of the plurality of predetermined bed locations. Merely by way of example, the processing engine 140 may generate a first reference sinogram based on a first set of reference emission data. The first reference sinogram may correspond to the first reference bed location corresponding to the first set of reference emission data. As another example, the processing engine 140 may generate a second reference sinogram based on a second set of reference emission data different from the first set of reference emission data. The second reference sinogram may correspond to the second reference bed location corresponding to the second set of reference emission data. As a further example, the processing engine 140 may generate a positioning sinogram based on the positioning emission data. The positioning sinogram may also be referred to as a measured sinogram.

In some embodiments, the processing engine 140 may be a single server or a server group. The server group may be centralized or distributed. In some embodiments, the processing engine 140 may be local or remote. For example, the processing engine 140 may access information and/or data stored in the PET scanner 110, the terminal 130, and/or the storage 150 via the network 120. As another example, the processing engine 140 may be directly connected to the PET scanner 110, the terminal 130 and/or the storage 150 to access stored information and/or data. In some embodiments, the processing engine 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing engine 140 may be implemented by a computing device 200 having one or more components as illustrated in FIG. 2.

The working bed location determined according to the present disclosure may further be used to correct an image relating to an object to with respect to the effect due to a bed shift caused at least partially by the weight of the bed itself and/or the weight of the object placed on the bed so that the object is scanned.

Merely by way of example with reference to a CT/PET system, such a correction may reduce a mismatch between a CT image and a PET image acquired in the CT-PET system. The CT-PET system may comprise a CT scanner and a PET scanner. The two scanners may be assembled in a unique gantry, use the same patient bed and are controlled by the same console workstation.

An object (for example, a patient) is scanned by a first imaging component (e.g., a CT component) of the CT-PET system at a first bed location to generate a CT image, and scanned by a second imaging component (e.g., a PET component) of the CT-PET system at a second bed location to generate a PET image. Assume that there is no bed shift at the first bed location (e.g., relative to a set-up bed location), the weight of the patient may cause a bed shift at the second bed location. The second bed location may be different from the first bed location, resulting in a mismatch between the PET image and the CT image. The second bed location and/or the bed shift at the second bed location with respect to the first bed location may be determined, the PET image and/or the CT image may be compensated with the bed shift, thereby reducing the mismatch. Merely by way of example, the CT image may be corrected by aligning the CT image with the PET image based on the determined bed shift. An attenuation map related to the object (e.g., the patient) may be generated based on the corrected CT image, which may further be used to process the PET image. As another example, an attenuation map may be generated based on the CT image, which may further be corrected based on the determined bed shift, to generate a corrected attenuation map. The corrected attenuation map may be adapted to process the PET image. The second bed location and the first bed location may be determined by the exemplary process illustrated in the present disclosure. As another example, the CT image may be aligned with the PET image based on the determined bed shift, to generate an aligned CT image. Or, in other words, a mismatch between the CT image and the PET image may be adjusted based on the determined bed shift. An attenuation map for the PET image may be generated based on the aligned CT image. As a further example, an attenuation map may be generated based on the CT image. In some embodiments, the bed shift may be modeled in an imaging reconstruction with the attenuation map. A projection equation may be used to transform the bed shift from the image domain to a sinogram domain. The set of imaging emission data may be corrected based on the transformed bed shift, to generate a set of corrected imaging emission data. An attenuation corrected PET image may be generated from the corrected imaging emission data, according to the attenuation map. As a further example, a PET image reconstruction algorithm may be adapted based on the determined bed shift. The PET image may be generated by the adapted PET image reconstruction algorithm.

The storage 150 may store data, instructions, and/or any other information. In some embodiments, the storage 150 may store data obtained from the terminal 130 and/or the processing engine 140. In some embodiments, the storage 150 may store data and/or instructions that the processing engine 140 may execute or use to perform exemplary methods described in the present disclosure. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more other components in the PET system 100 (e.g., the processing engine 140, the terminal 130, etc.). One or more components in the PET system 100 may access the data or instructions stored in the storage 150 via the network 120. In some embodiments, the storage 150 may be directly connected to or communicate with one or more other components in the PET system 100 (e.g., the processing engine 140, the terminal 130, etc.). In some embodiments, the storage 150 may be part of the processing engine 140.

FIG. 2 is a schematic diagram illustrating exemplary hardware and/or software components of an exemplary computing device 200 on which the processing engine 140 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing engine 140 in accordance with techniques described herein. The computer instructions may include, for example, routines, programs, objects, components, data structures, procedures, modules, and functions, which perform particular functions described herein. For example, the processor 210 may process emission data obtained from the PET scanner 110, the terminal 130, the storage 150, and/or any other component of the PET system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 220 may store data/information obtained from the PET scanner 110, the terminal 130, the storage 150, and/or any other component of the PET system 100. In some embodiments, the storage 220 may include a mass storage, removable storage, a volatile read-and-write memory, a read-only memory (ROM), or the like, or any combination thereof. For example, the mass storage may include a magnetic disk, an optical disk, solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing engine 140 for processing emission data or image data.

The I/O 230 may input and/or output signals, data, information, etc. In some embodiments, the I/O 230 may enable a user interaction with the processing engine 140. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing engine 140 and the PET scanner 110, the terminal 130, and/or the storage 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
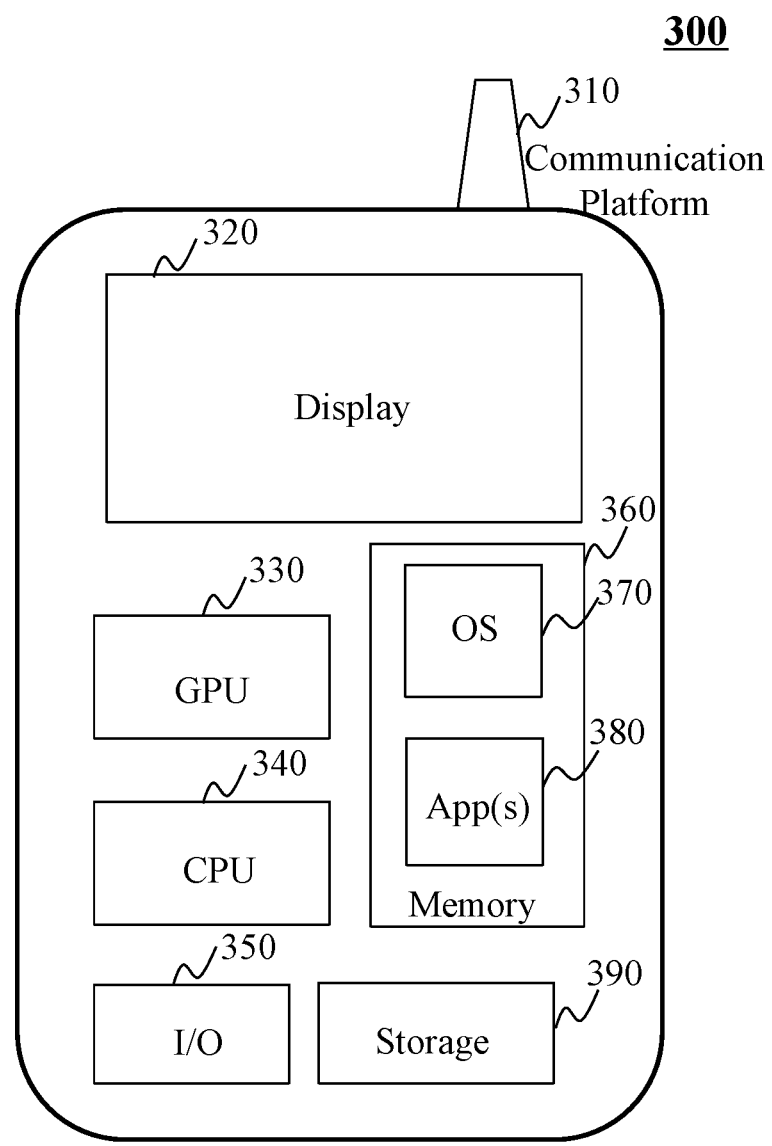
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device 300 on which the terminal 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage

390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to data processing or other information from the processing engine 140. User interactions with the information stream may be achieved via the I/O 350 and provided to the processing engine 140 and/or other components of the PET system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
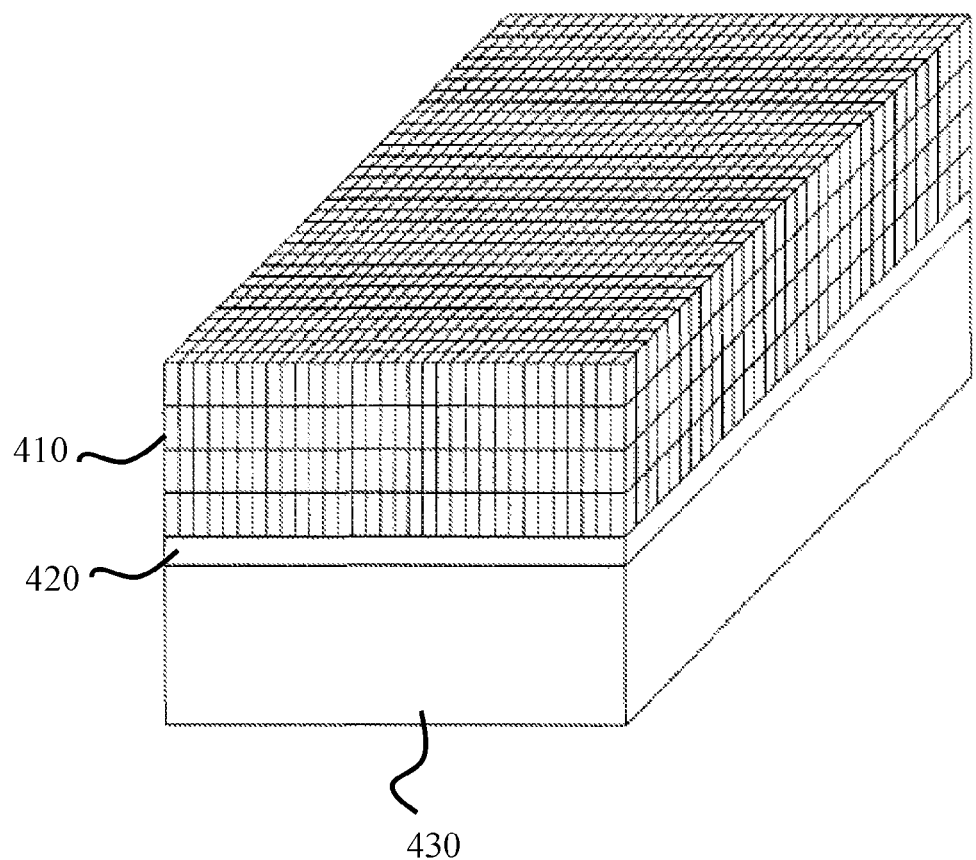
FIG. 4 is a perspective view of the detector block according to some embodiments of the present disclosure.

FIG. 4 is a perspective view of the detector block 114 according to some embodiments of the present disclosure. The detector block 114 may include one or more detector units. As shown in FIG. 4, the detector block 114 may include a scintillator block 410, a light guide 420, and a photomultiplier tube 430. The scintillator block 410 may include a plurality of scintillator crystals. A detector unit of the detector block 114 may include a scintillator crystal. The light guide 420 may be optically coupled to the scintillator block 410 to receive light signals from the scintillator block 410. The photomultiplier 430 may be optically coupled to the light guide 420 to receive light signals from the light guide 420.

The scintillator block 410 may include a plurality of scintillator crystals. The scintillator crystals may include different kinds of compounds. Exemplary compounds may include Bismuth germinate (BGO), barium fluoride (BaFl), gadolinium silicate (GSO), Lutetium orthosilicate (LSO), Lutetium Yttrium orthosilicate (LYSO), or the like, or a combination thereof. The plurality of scintillator crystals may detect photons (e.g., gamma photons) or beta particles impinging on them. In some embodiments, the photon or beta particle impinging on a certain scintillator crystal may be emitted from the scintillator crystal itself. Merely by way of example, the plurality of scintillator crystals may receive a plurality of counts of beta particles or gamma photons of a first energy level (e.g., 307 or 202 KeV) originating from intrinsic background radiation of the plurality of scintillator crystals. As illustrated in connection with the detector block 114, beta decay of the scintillator crystal may generate photons. Merely by way of example, the scintillator block 410 may include Lu-176, which may emit photons of the first energy level as a result of beta decay.

In some embodiments, photons impinging on the scintillator crystal may be emitted from an object (e.g., a patient) located within the detecting region 113. As described in connection with the detector block 114, the object (e.g., the patient) located within the detecting region 113 may emit photons originated from annihilation events associated with radioactive molecules within the object. The photons originated from the annihilation event may be of a second energy level (e.g., 511 KeV) different from the energy level of the photons originated from the scintillator crystals of the detector block 114. The detector block 114 may detect emission data of gamma photons of multiple energy levels originating from intrinsic background radiation and annihilation events associated with radioactivity of a patient on the bed. The multiple energy levels include 511 KeV and the first energy level (e.g., 202 keV or 307 keV).

In some embodiments, the scintillator block 410 may further convert photons (e.g., gamma photons) impinging on the scintillator crystal into the light. The light may further diffuse in the scintillator block 410 and may transmit to the photomultiplier tube 430 through the light guide 420.

The photomultiplier tube 430 may convert the light transmitted thereto by the light guide 420. The photomultiplier tube 430 may convert the light into an electric signal. In some embodiments, the electric signal may be further sent to the processing engine 140. It should be noted here that the photomultiplier tube 430 is merely provided for illustrating an example of an optical-to-electric signal converter, and not intended to limit the scope of the present disclosure. For example, the optical-to-electric converter may further include a photo-diode, an electrophotonic detector block 114, or the like, or any combination thereof.

It should be noted that the above description of the detector block 114 is merely provided for the purposes of illustration, and not intended to limit the scope of the present disclosure. For persons having ordinary skills in the art, multiple variations and modifications may be made under the teaching of the present invention. However, those variations and modifications do not depart from the scope of the present disclosure. For example, the detector block 114 may include one or more detector sub-blocks. The detector sub-blocks of the detector block 114 may be arranged in the form of a ring or a cylinder so that a cross-section of the detector block 114 may be essentially a closed shape including, for example, a circle, an ellipse, a polygon, or the like. As used herein, the detector blocks being arranged in the form of a ring may be referred to as a "detector ring." The detector block 114 may include one or more detector rings. Such a detector block 114 may surround the object being tested in the z direction. As another example, while Lu-176 is used in the above examples, the detector block 114 may use alternative materials to produce a radiation.

Figure 5:
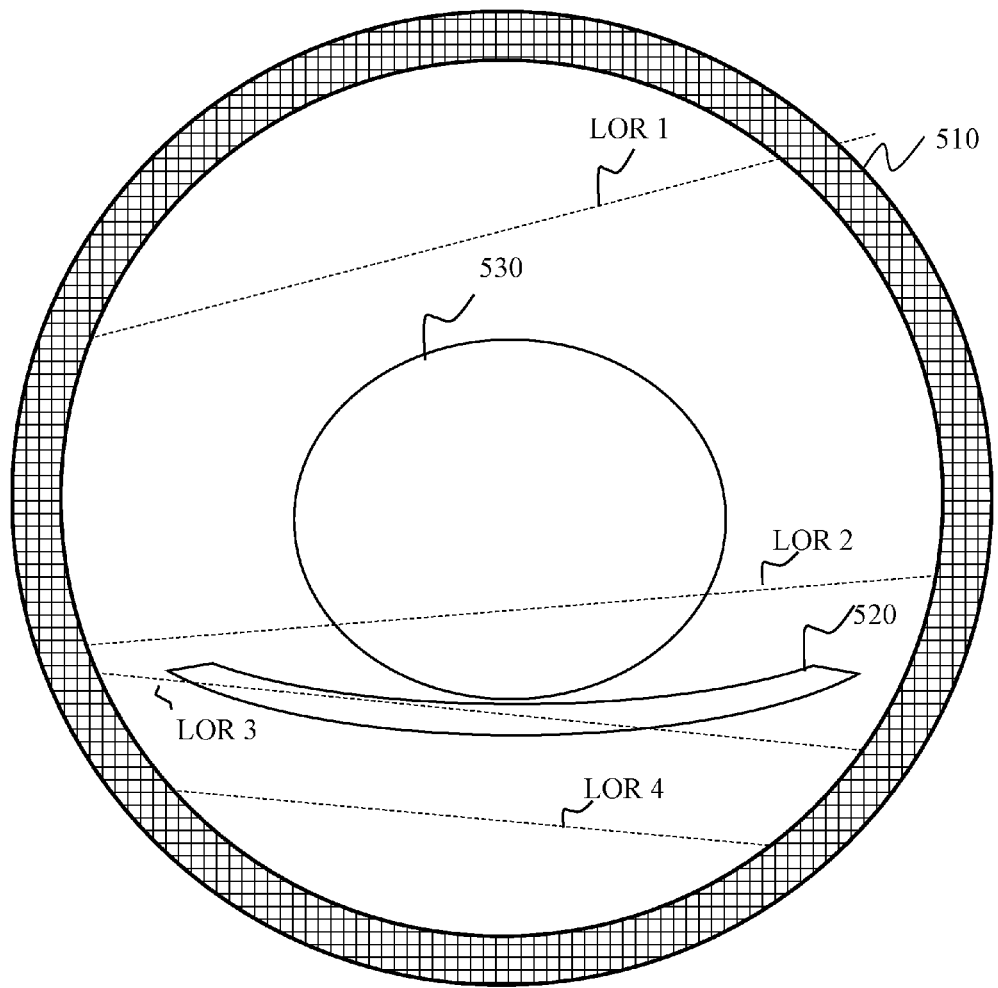
FIG. 5 is a front view of the PET scanner according to some embodiments of the present disclosure.

FIG. 5 is a front view of the PET scanner 110 according to some embodiments of the present disclosure. As shown in FIG. 5, a bed 520 may be located or move within the PET scanner 110. An object 530 with a certain weight may be located on the bed 520. The bed 520 may deform due to, for example, the weight of the object 530, the weight of the bed 520 itself, etc. The detector 510 may emit and detect photons of a first energy level (not shown). The detected photons may identify a plurality of background LORs (e.g., LOR 1, LOR 2, LOR 3, LOR 4, etc.). The plurality of background LORs may pass through different regions of the PET scanner 110. In some embodiments, some of the plurality of the background LORs may cross the regions in or under the bed 520, and the other background LORs may cross the region above the bed 520. LOR 1 and LOR 2 may cross the region above the bed 520, respectively. Specifically, LOR 1 may cross the region above the object 530, and LOR 2 may pass through the object 530. LOR 3 and LOR 4 may cross the region in or under the bed 520, respectively. Specifically, LOR 3 may cross the bed 520 and LOR 4 may cross the region under the bed 520. In some embodiments, only the emission data corresponding to the background LORs crossing the regions in or under the bed 520 may be used, for example, by the processing engine 140, to determine the bed location.

FIG. 6-A and FIG. 6-B are exemplary diagrams illustrating the bed location according to some embodiments of the present disclosure. As illustrated in FIGS. 6-A and 6-B, the bed 620 may be surrounded by the detector 610. The bed 620 may be moved to different bed locations based on factors including, for example, one or more features (e.g., length, weight, etc.) of an object being placed on it, a specific area of interest on the object to be imaged, or the like, or a combination thereof. For example, no object is placed on the bed 620 when the bed 620 is located at a bed location as illustrated in FIG. 6-A. As another example, the bed 620 may support an object 630, and the bed 620 is located at a bed location as illustrated in FIG. 6-B. As illustrated, the bed location illustrated in FIG. 6-B may be different from the bed location illustrated in FIG. 6-A.

Figure 7:
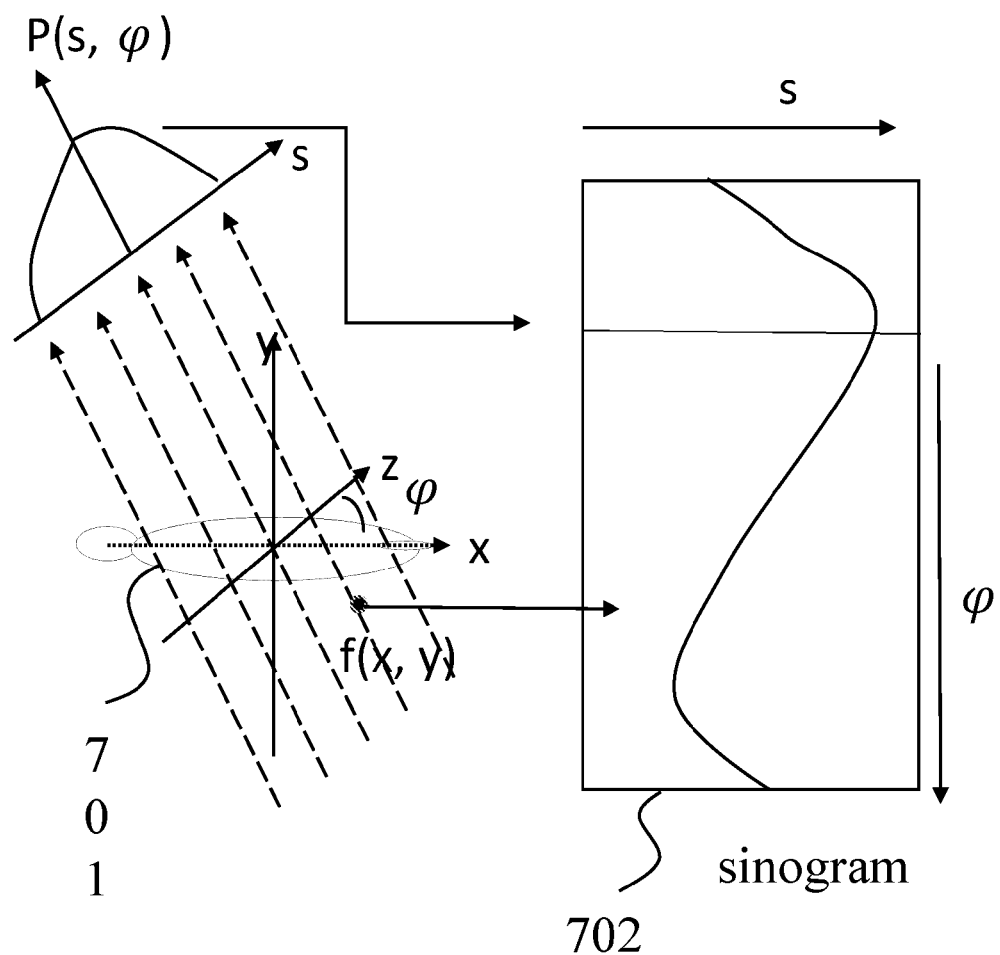
FIG. 7 is a schematic diagram illustrating a sinogram according to some embodiments of the present disclosure.

FIG. 7 is a schematic diagram illustrating a sinogram according to some embodiments of the present disclosure. As illustrated in FIG. 7, a patient 701 may be scanned to generate a sinogram 702. s may correspond to the distance along the imaging plane perpendicular to the scanner axis. φ may correspond to the angle of the detector plane with respect to the x axis in (x, y) coordinate space (in other words, φ corresponds to a particular LOR direction).

Figure 8:
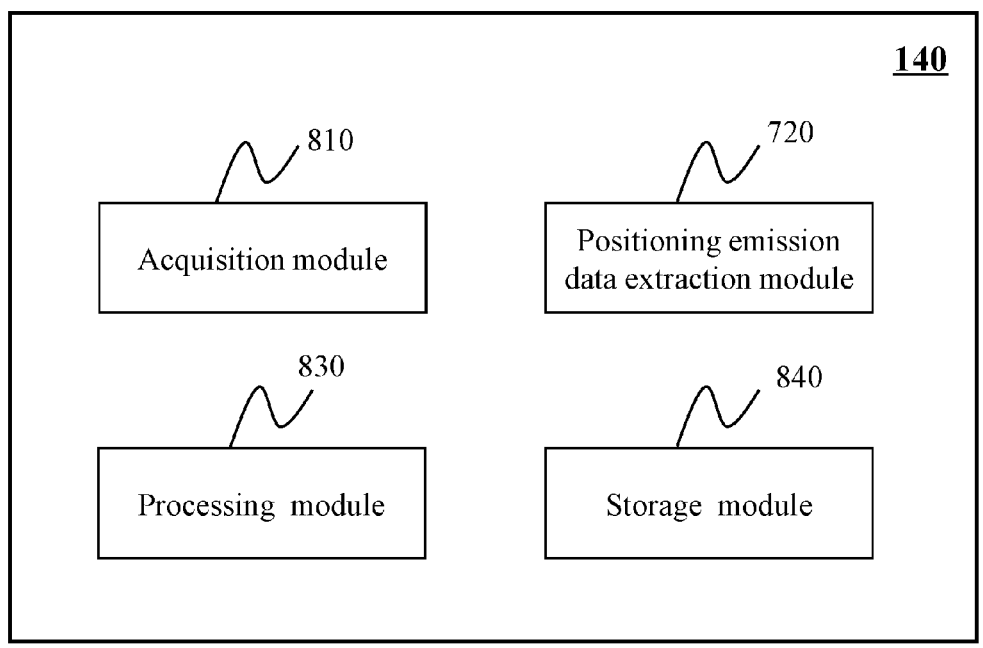
FIG. 8 is a schematic diagram illustrating an exemplary processing engine according to some embodiments of the present disclosure.

FIG. 8 is a schematic diagram illustrating an exemplary processing engine 140 according to some embodiments of the present disclosure. As illustrated in FIG. 7, the processing engine 140 may include an acquisition module 810, a positioning emission data extraction module 820, a processing module 830, and a storage module 840. The processing engine 140, or a portion thereof, may be implemented on a computing device as illustrated in FIG. 2, or a mobile device as illustrated in FIG. 3.

The acquisition module 810 may acquire emission data and/or bed location(s). The acquisition module 810 may acquire reference information and working emission data from the PET scanner 110 (e.g., the detector block 114). As described in connection with the detector block 114, the reference information may include reference-emission data (or referred to as self emission data) and reference bed location(s) corresponding to the reference emission data. The acquisition module 810 may acquire the reference emission data, the reference bed location(s) corresponding to the reference emission data, and the working emission data. Merely by way of example, the acquisition module 810 may acquire a first set of reference emission data, a first reference bed location corresponding to the first set of reference emission data, a second set of reference emission data, a second reference bed location corresponding to the second set of reference emission data, and the working emission data. The first set of reference emission data and the second set of reference emission data may include emission data relating to photons of a first energy level (e.g., 202 KeV, or 307 KeV). The working emission data may include positioning emission data and/or imaging emission data. The positioning emission data may relate to photons of the first energy level (e.g., 202 KeV, or 307 KeV). The imaging emission data may relate to photons of a second energy level (e.g., 511 KeV).

In some embodiments, the acquisition module 810 may be connected to or communicate with the positioning emission data extraction module 820, the processing module 830, and/or the storage module 840, and transmit the acquired emission data thereto. Merely by way of example, the acquisition module 810 may transmit the first set of reference emission data, the first reference bed location, the second set of reference emission data, and the second reference bed position to the processing module 830 and/or the storage module 840. As another example, the acquisition module 810 may transmit the first set of reference emission data, the second set of reference emission data, and/or the working emission data to the positioning emission data extraction module 820.

The positioning emission data extraction module 820 may extract the emission data. See, for example, relevant description in connection with the processing engine 140. The positioning emission data extraction module 820 may extract the positioning emission data from the working emission data. As described in connection with the processing engine 140, in some embodiments, the positioning emission data extraction module 820 may extract the positioning emission data based on the time-of-flight for (and/or the energy of) the detected photon(s) impinging on the detector block 114 that correspond to the emission originated from an object being scanned, e.g., an object located within the detecting region 113 of the PET system 100. In some embodiments, the positioning emission data extraction module 820 may filter the reference emission data and the corresponding bed location(s). Merely by way of example, the positioning emission data extraction module 820 may filter out, remove, or reduce the noise (e.g., electrical noise) of the reference emission data and the corresponding bed location(s).

The processing module 830 may process the emission data and/or bed location(s). The processing module 830 may acquire the reference emission data, reference bed location, and/or the positioning emission data from, for example, the acquisition module 810, the positioning emission data extraction module 820, or the like, or a combination thereof. In some embodiments, the processing module 830 may generate sinograms based on the emission data. Merely by way of example, the processing module 830 may generate a measured sinogram based on the positioning emission data. In some embodiments, the processing module 830 may determine a bed location (e.g., the working bed location) based on the acquired emission data (or sinograms). Merely by way of example, the processing module 830 may determine the working bed location based on reference emission data (e.g., a first set of reference emission data and a second set of reference emission data) associated with a reference bed location (e.g., a first reference bed location and a second reference bed location), and positioning emission data. In some embodiments, the processing module 830 may determine the bed location based on different algorithms. Merely by way of example, the processing module 830 may determine the working bed location by interpolation. As another example, the processing module 830 may employ a maximum likelihood algorithm to determine the working bed location.

The storage module 840 may store the emission data, the processed emission data, or the like, or any combination thereof. In some embodiments, the storage may store one or more programs and/or instructions that may be executed by the processor(s) of the processing engine 140 to perform exemplary methods described in this disclosure. For example, the storage may store program(s) and/or instruction(s) that can be executed by the processor(s) of the processing engine 140 to cause the PET system 100 or a portion thereof to acquire emission data and/or to process the PET data, etc. In some embodiments, the storage module 840 may store the algorithms to be employed by the processing module 830. The algorithms may include a maximum likelihood algorithm, an interpolation algorithm, etc. In some embodiments, the storage module 840 may include a mass storage. For example, the mass storage may include a magnetic disk, an optical disk, solid-state drives, etc.

It should be noted that the above description of the processing engine 140 is merely provided for the purposes of illustration, and not intended to limit the scope of the present disclosure. For persons having ordinary skills in the art, multiple variations and modifications may be made under the teaching of the present invention. However, those variations and modifications do not depart from the scope of the present disclosure. For example, the acquisition module 810 rather than the positioning emission data extraction module 820 may be configured to extract the positioning emission data from the working emission data.

Figure 9:
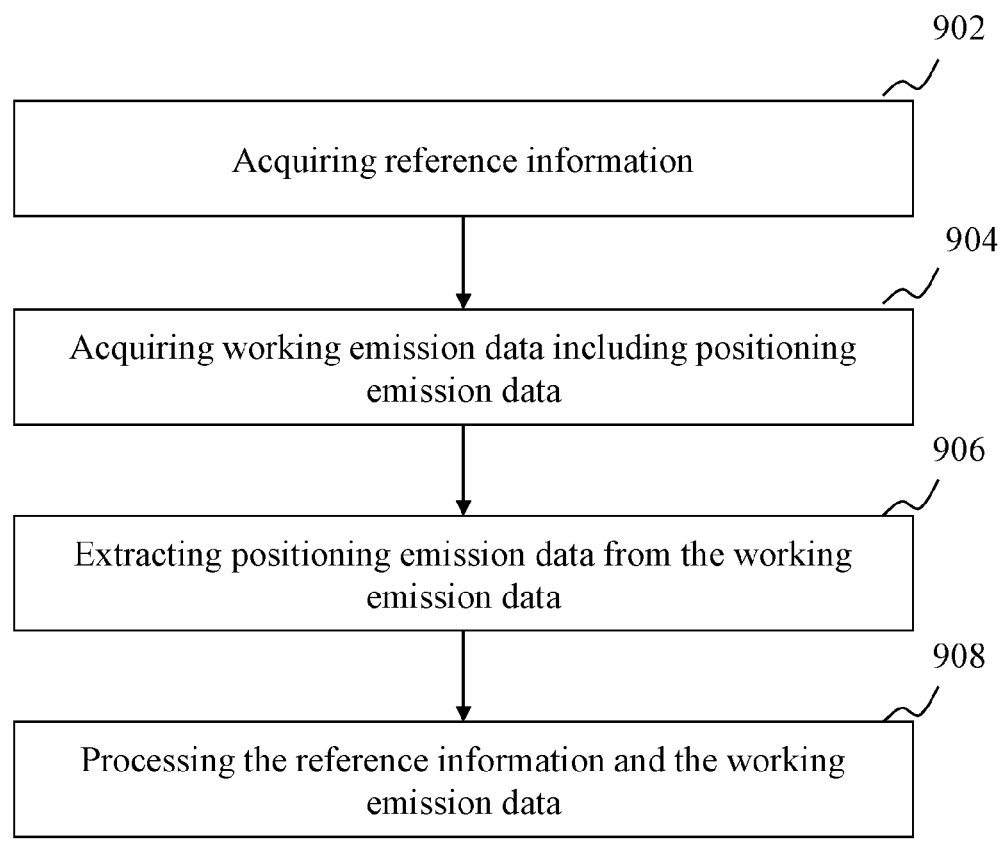
FIG. 9 is a flowchart illustrating an exemplary process for processing the emission data according to some embodiments of the present disclosure.

FIG. 9 is a flowchart illustrating an exemplary process 900 for processing the emission data according to some embodiments of the present disclosure. The process, or a portion thereof, may be implemented on a computing device as illustrated in FIG. 2 or a mobile device as illustrated in FIG. 3. For illustration purposes, the following description is provide with reference to the PET system 100 as illustrated in FIG. 1. As already described, the PET system 100 includes the detector block 114 including scintillator crystals (as illustrated in FIG. 4).

In 902, the reference information may be acquired. The reference information may be acquired by the acquisition module 810. The acquired reference information may include a first set of reference emission data, a first reference bed location corresponding to the first set of reference emission data, and a second set of reference emission data, a second reference bed location and corresponding to the second set of reference emission data.

In 904, the working emission data may be acquired; the working emission data may include positioning emission data. Merely by way of example, the working emission data may include positioning emission data and imaging emission data. The working emission data may be acquired by the acquisition module 810.

In 906, the positioning emission data may be extracted from the working emission data. The positioning emission data may be extracted by the positioning emission data extraction module 820. In some embodiments, the positioning emission data may be extracted based on the time-of-flight for (and/or the energy of) the detected photon(s) impinging on the detector block 114 that correspond to the emission originated from an object being scanned, e.g., an object located within the detecting region 113 of the PET system 100.

In 908, the reference information and the positioning emission data may be processed. The reference information and the positioning emission data may be processed by the processing module 830. The reference emission data (e.g., the first set of reference emission data and the second set of reference emission data), the bed location(s) corresponding to the reference emission data (e.g., the first reference bed location and the second reference bed location), and the positioning emission data, may be processed to determine the working bed location. An algorithm (e.g., interpolation, maximum likelihood, etc.) may be employed in the processing of the reference information and the positioning emission data. In some embodiments, sinograms may be generated from the reference emission data and the positioning emission data. Specifically, a plurality of sinograms may be generated based on the reference emission data, and a measured sinogram may be generated based on the positioning emission data. The bed location may be determined by comparing the measured sinogram with the plurality of reference sinograms.

It should be noted that the flowchart described above is provided for the purposes of illustration, not intended to limit the scope of the present disclosure. For persons having ordinary skills in the art, multiple variations and modifications may be reduced to practice in the light of the present disclosure. However, those variations and modifications do not depart from the scope of the present disclosure. For example, an operation in which the emission data and/or the bed location(s) may be stored may be added to the process 900.

Figure 10:
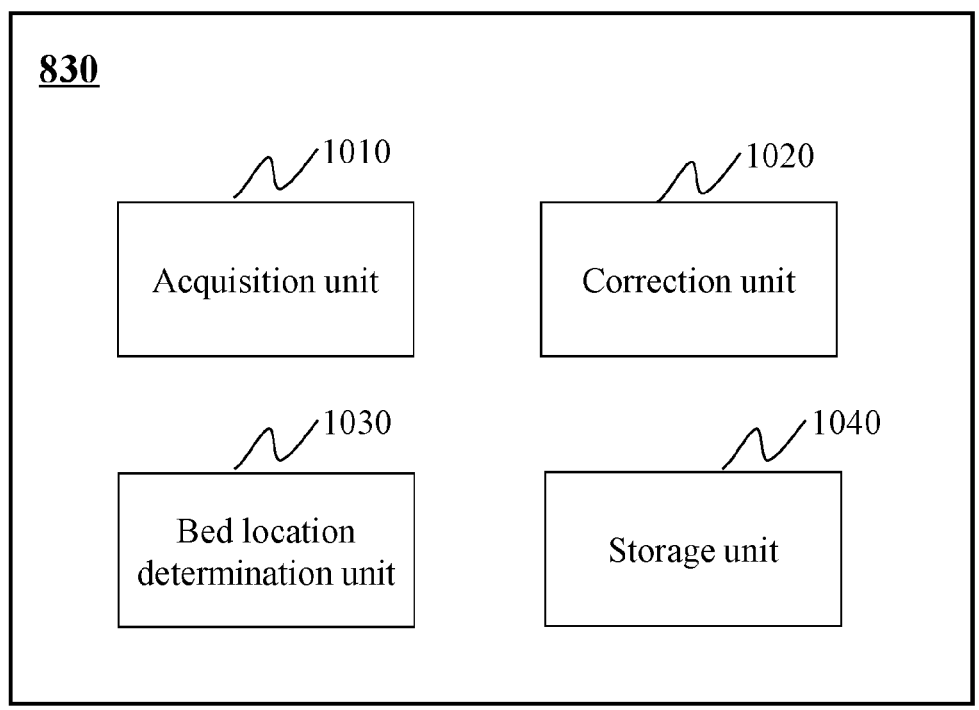
FIG. 10 is a schematic diagram illustrating an exemplary processing module according to some embodiments of the present disclosure.

FIG. 10 is a schematic diagram illustrating an exemplary processing module 830 according to some embodiments of the present disclosure. As illustrated in FIG. 10, the processing module 830 may include an acquisition unit 1010, a correction unit 1020, a bed location determination unit 1030, and a storage unit 1040. The processing module 830, or a portion thereof, may be implemented on a computing device as illustrated in FIG. 2, or a mobile device as illustrated in FIG. 3.

The acquisition unit 1010 may acquire emission data and/or bed location(s). The acquisition unit 1010 may acquire emission data and/or bed location(s) from the acquisition module 810, the positioning emission data extraction module 820 and/or the detector block 114. The acquisition unit 1010 may acquire reference emission data (e.g., a first set of reference emission data and a second set of reference emission data), the bed location(s) corresponding to the reference emission data (e.g., a first bed reference position and a second reference bed location), and positioning emission data. The first set of reference emission data and the second set of reference emission data may be acquired at the first reference bed location and the second reference bed location, respectively. In some embodiments, the acquisition unit 1010 may acquire reference information including a plurality of reference bed locations and a plurality of sets of reference emission data acquired when the bed is located at respective reference bed locations. In some embodiments, the reference information may be organized as a library. In some embodiments, the library may include a lookup table. For instance, the lookup table may include a first correspondence between the first reference bed location and the first set of reference emission data, and a second correspondence between the second reference bed location and the second set of reference emission data.

In some embodiments, the acquisition unit 1010 may be connected to or communicate with the correction unit 1020, the bed location determination unit 1030, and/or the storage unit 1040. Merely by way of example, the acquisition unit 1010 may transmit the first set of reference emission data and the second set of reference emission data to the storage unit 1040 and/or the bed location determination unit 1030. As another example, the acquisition unit 1010 may transmit the positioning emission data to the correction unit 1020.

The correction unit 1020 may correct the positioning emission data. In some embodiments, the correction unit 1020 may correct the positioning emission data for error emission data relating to photons of the second energy level. Merely by way of example, the correction unit 1020 may correct the positioning emission data for a random coincidence and/or a scattered coincidence due to photons of the second energy level. In some embodiments, the correction unit 1020 may correct the positioning emission data for the random coincidence based on a delay window. As used herein, the delay window may refer to a time window configured to determine emission data corresponding to a delay coincidence. For example, when the time-of-flight for photons corresponding to the emission data impinging on the detector block 114 is within the delay window, the emission data may be deemed to correspond to a delay coincidence. In some embodiments, the correction unit 1020 may correct positioning emission data with respect to random coincidence based on the emission data corresponding to delay coincidence. In some embodiments, the correction unit 1020 may correct the positioning emission data with respect to scattered coincidence based on a scatter correction algorithm (e.g., a model-based scatter correction algorithm). The model-based scatter correction algorithm may include, for example, the single scatter simulation (SSS) algorithm. In some embodiments, the correction unit 1020 may communicate with the bed location determination unit 1030, and transmit the corrected positioning emission data to the bed location determination unit 1030. In some embodiments, the correction unit 1020 may generate sinograms based on the emission data. Merely by way of example, the correction unit 1020 may generate a plurality of reference sinograms from the reference emission data, and a measured sinogram based on the positioning emission data. The correction unit 1020 may compensate the measured sinogram by removing scattering or random coincidence factors therein. A detailed description of removing scattering or random coincidence may be illustrated elsewhere in the present disclosure.

The bed location determination unit 1030 may determine the working bed location. The bed location determination unit 1030 may be connected to or communicate with the acquisition unit 1010 and/or the correction unit 1020, and acquire emission data therefrom. As described in connection with the acquisition unit 1010 and the correction unit 1020, the bed location determination unit 1030 may acquire the reference emission data associated with the corresponding reference bed location(s), and the (corrected) positioning emission data, from the acquisition unit 1010 and/or the correction unit 1020, respectively. In some embodiments, the bed location determination unit 1030 may determine the working bed location corresponding to the positioning emission data, based on reference emission data (e.g., a first set of reference emission data and a second set of reference emission data), the reference bed location corresponding to the reference emission data (e.g., a first reference bed location at which the first set of reference emission data was acquired, and a second reference bed location at which the second set of reference emission data was acquired, etc.), and the positioning emission data.

In some embodiments, the bed location determination unit 1030 may determine a relationship of the first reference bed location, the first set of reference emission data, the second reference bed location, and the second set of reference emission data. The bed location determination unit 1030 may further determine the working bed location based on the positioning emission data and the relationship. In some embodiments, the relationship may be retrieved from a library of reference information. See, for example, the relevant description in connection with the acquisition unit 1010 and the description thereof. In some embodiments, the library may include a lookup table. The bed location determination unit 1030 may determine the working bed location based on the lookup table. The bed location determination unit 1030 may employ various algorithms to determine a working bed location. Exemplary algorithms may include an interpolation algorithm, a maximum likelihood algorithm, etc.

The storage unit 1040 may be connected to the acquisition unit 1010, the correction unit 1020, and/or the bed location determination unit 1030. Merely by way of example, the storage unit 1040 may store the reference emission data, the positioning emission data, and/or the reference lookup table transmitted by the acquisition unit 1010. As another example, the storage unit 1040 may store the corrected positioning emission data generated by the correction unit 1020.

It should be noted that the above description of the processing module 830 is merely provided for the purposes of illustration, and not intended to limit the scope of the present disclosure. For persons having ordinary skills in the art, multiple variations and modifications may be made to the teaching of the present invention. However, those variations and modifications do not depart from the scope of the present disclosure. For example, the correction unit 1030 may be omitted.

Figure 11:
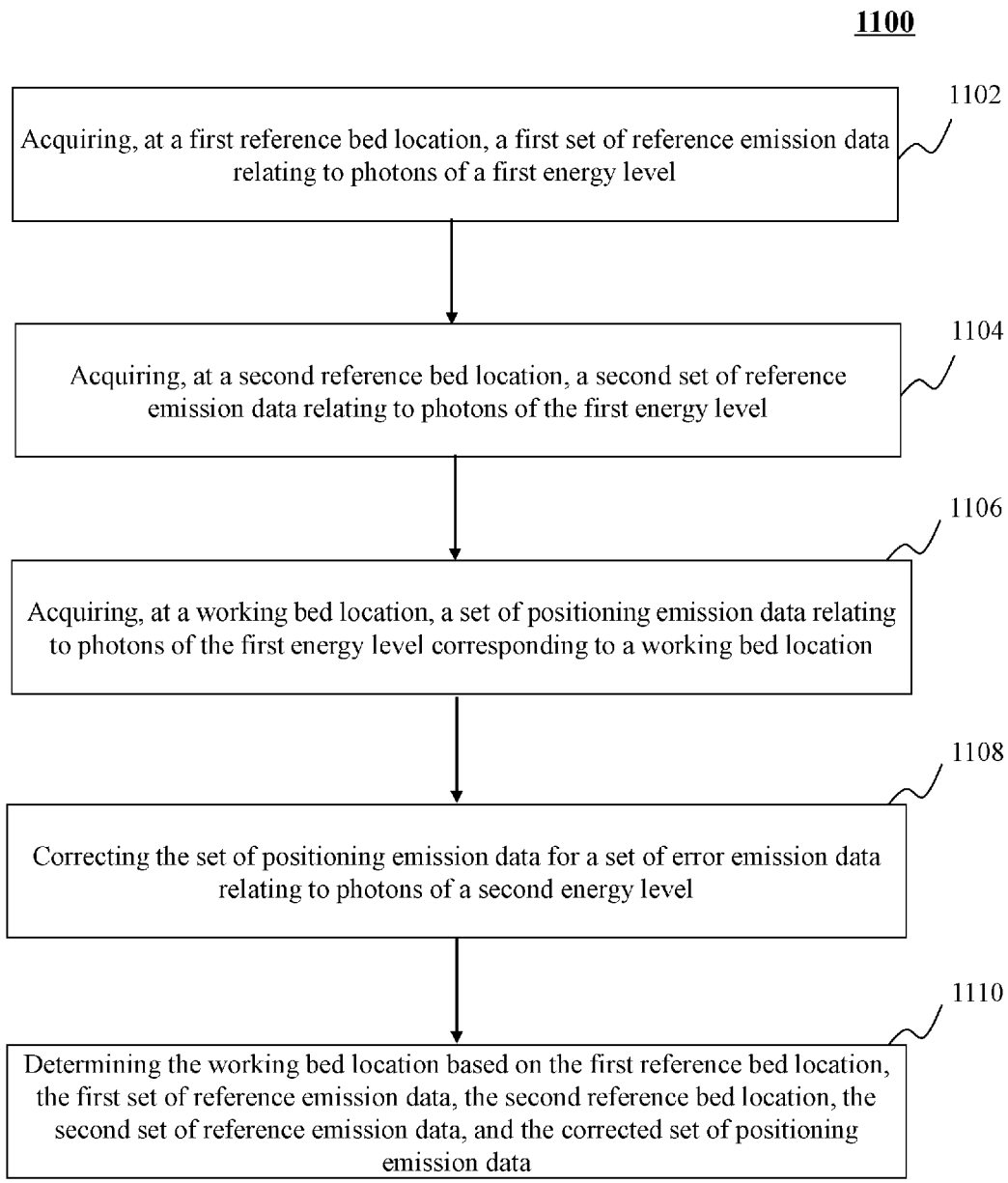
FIG. 11 is a flowchart illustrating an exemplary process for determining the working bed location according to some embodiments of the present disclosure.

FIG. 11 is a flowchart illustrating an exemplary process 1100 for determining the working bed location of a bed in a PET system according to some embodiments of the present disclosure. The process, or a portion thereof, may be implemented on a computing device as illustrated in FIG. 2 or a mobile device as illustrated in FIG. 3. For illustration purposes, the following description is provide with reference to the PET system 100 as illustrated in FIG. As already described, the PET system 100 includes the detector block 114 including scintillator crystals (as illustrated in FIG. 4).

In 1102, a first set of reference emission data relating to photons of a first energy level may be acquired at a first reference bed location. The first set of reference emission data may be acquired by the acquisition unit 1010. The first energy level may correspond to photons emitted from a scintillator crystal of the detector block 114.

In 1104, a second set of reference emission data relating to photons of the first energy level may be acquired at a second reference bed location. The second set of reference emission data may be acquired by the acquisition unit 1010.

In some embodiments, the first set of reference bed location and the corresponding first set of reference emission data, and/or the second set of reference bed location and the corresponding second set of reference emission data may be acquired from a library of reference information described elsewhere the present disclosure. The library may include a lookup table including a first correspondence between the first reference bed location and the first set of reference emission data, and a second correspondence between the second reference bed location and the second set of reference emission data.

It should be noted that the description of 1102 and 1104 are merely provided for illustrating purposes. In some embodiments, additional reference information may be acquired. For instance, acquired additional reference information may include a third reference bed location and a third set of reference emission data acquired at the third reference bed location, a k-th reference bed location and a k-th set of reference emission data acquired at the k-th reference bed location, etc. The number k may represent an integer larger than 1.

In 1106, a set of positioning emission data relating to photons of the first energy level corresponding to a working bed location may be acquired. Exemplary operations for acquiring a set of positioning emission data may be found elsewhere in the present disclosure. See, for example, operations 904 and 906 in FIG. 9 and the description thereof.

In 1108, the set of positioning emission data may be corrected based on a set of error emission data relating to photons of a second energy level. The second energy level may correspond to photons emitted from an object located on the bed of the PET system 100 and detected when the bed is located at the working bed location. The set of positioning emission data may be corrected by the correction unit 1020. The positioning emission data may be corrected for the random coincidence and/or the scattered coincidence. In some embodiments, the random coincidence may be determined based on the delay coincidence determined by the delay window. In some embodiments, the positioning emission data may be corrected for the random coincidence by subtracting the emission data corresponding to the delay coincidence. The scattered coincidence may be corrected based on a scatter correction algorithm (e.g., a model-based scatter correction algorithm). Additional description may be found elsewhere in the present disclosure. See, for example, FIG. 10 and the description thereof.

In 1110, the working bed location may be determined based on the corrected set of positioning emission data and the acquired reference information. The working bed location may be determined by the bed location determination unit 1030. In some embodiments, the acquired reference information may include the first reference bed location, the first set of reference emission data, the second reference bed location and the second set of reference emission data. The working bed location may be determined based on the positioning emission data and a relationship of the first reference bed location, the first set of reference emission data, the second reference bed location, and the second set of reference emission data.

In some embodiments, the working bed location may be determined by interpolation. Merely by way of example, the working bed location may be determined by employing a spline interpolation algorithm. For example, relationships of the corrected positioning emission data to the first set of reference emission data and to the second set of reference emission data may be determined. The working bed location may be determined based on the first reference bed location, the second reference bed location, and the determined relationship.

In some embodiments, the working bed location may be determined by comparing the similarity between reference emission data and positioning emission data. For instance, the similarity may be determined by:

$$F(d_k,d) = \Sigma_i d_k(i) * d(i) / \sqrt{\Sigma_i d_k^2(i)} \sqrt{\Sigma_i d^2(i)}. \quad (9)$$

Equation (9) may describe the similarity between s and $s_k$. In Equation (1), $d_k$ may represent the k-th set of reference emission data (or the corresponding sinogram of the k-th set of reference emission data), and d may represent the set of positioning emission data (or a sinogram corresponding to the set of positioning emission data). The k may represent an integer larger than 1. The k-th set of reference emission data (or a sinogram corresponding to the k-th set of reference emission data) may include a plurality of data points. The i-th data point of the plurality of data points of the k-th set of reference emission data (or the corresponding sinogram of the k-th set of reference emission data) may be expressed as $d_k(i)$. The number i may represent an integer larger than 1. Likewise, the set of positioning emission data (or the corresponding sinogram of the set of positioning emission data) may include a plurality of data points. The i-th data point of the plurality of data points of the positioning emission data (or the corresponding sinogram of the set of positioning emission data) may be expressed as d(i).

For instance, the likelihood of the working bed location being located in the k-th reference bed location corresponding to the k-th set of reference emission data may correlate with the similarity between reference emission data and positioning emission data as indicated by (9):

$$LL(k) \propto F(d_k,d). \quad (9)$$

Accordingly, the working bed location may be determined by, for example:

$$k = \underset{k}{\operatorname{argmax}} L(k). \quad (10)$$

Merely by way of example, the working bed location may be determined to be the k-th reference bed location corresponding to the k-th set of reference emission data $d_k$.

It should be noted that the flowchart described above is provided for the purposes of illustration, not intended to limit the scope of the present disclosure. For persons having ordinary skills in the art, multiple variations and modifications may be reduced to practice in the light of the present disclosure. However, those variations and modifications do not depart from the scope of the present disclosure. For example, a step in which the first set of reference emission, the second set of reference emission data, and/or the set of positioning emission data may be stored may be added to the process 1100. As another example, operation 1108 in which the positioning emission data is corrected may be optional.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A system, comprising:
    at least one storage medium including a set of instructions; and
    at least one processor configured to communicate with the at least one storage medium, wherein when executing the set of instructions, the system is configured to:
        acquire a first reference bed location relating to a bed for supporting an object;
        acquire a first set of reference emission data relating to photons of a first energy level originated from radiation of scintillator crystals of a plurality of detectors, the first set of reference emission data corresponding to the first reference bed location;
        acquire, at a working bed location relating to the bed, a set of positioning emission data relating to photons of the first energy level, wherein the set of positioning emission data relating to photons of the first energy level originated from radiation of scintillator crystals of the plurality of detectors; and
        determine the working bed location based on the first reference bed location, the first set of reference emission data, and the set of positioning emission data.

2. The system of claim 1, wherein the scintillator crystals of the plurality of detectors include Lu-176.

3. The system of claim 2, wherein the first energy level includes 202 keV or 307 keV.

4. The system of claim 1, wherein to acquire a set of positioning emission data, the system is configured to:
    acquire, at the working bed location, a set of working emission data including the set of positioning emission data and a set of imaging emission data, the set of imaging emission data relating to photons originated from annihilation events within the object located within a detecting region of the system.

5. The system of claim 4, wherein the system is further configured to:
determine a bed shift from a set-up bed position of the determined working bed location, the bed shift being in an image domain.

6. The system of claim 5, wherein the system is further configured to:
generate a PET image based on the set of imaging emission data obtain a CT image related to the object;
align the CT image with the PET image based on the determined bed shift to generate an aligned CT image; and
generate, based on the aligned CT image, an attenuation map for the PET image.

7. The system of claim 5, wherein the system is further configured to:
obtain a CT image related to the object;
generate an attenuation map based on the CT image;
transform the bed shift from the image domain to a sinogram domain using a projection equation;
correct the set of imaging emission data based on the transformed bed shift to generate a set of corrected imaging emission data; and
generate an attenuation-corrected PET image from the corrected imaging emission data according to the attenuation map.

8. The system of claim 1, wherein the system is further configured to:
model the bed shift in an imaging reconstruction with a CT-based attenuation map.

9. The system of claim 1, wherein to determine the working bed location, the system is further configured to determine a similarity between the set of positioning emission data and at least one of the first set of reference emission data and the second set of reference emission data.

10. The system of claim 1, wherein the system is further configured to:
determine a second reference bed location relating to the bed; and
acquire a second set of reference emission data relating to photons of the first energy level originated from radiation of the scintillator crystals of the plurality of detectors, the second set of reference emission data corresponding to the second reference bed location.

11. The system of claim 10, wherein the system is further configured to obtain a library of reference information including reference bed locations and corresponding plurality sets of reference emission data, the reference information including the first reference bed location, the first set of reference emission data, the second reference bed location, and the second set of reference emission data.

12. The system of claim 11, wherein the system is further configured to determine a relationship of the first reference bed location, the first set of reference emission data, the second reference bed location, and the second set of reference emission data.

13. The system of claim 10, wherein the system is further configured to:
generate a first sinogram based on the first set of reference emission data;
generate a second sinogram based on the second set of reference emission data;
generate a third sinogram based on the set of positioning emission data;
determine a similarity between the third sinogram and at least one of the first sinogram and the second sinogram; and
determine the working bed location based on the determined similarity.

14. A method for operating an imaging system, the imaging system comprising a positron emission tomography (PET) scanner, the PET scanner including a bed being positioned within a bore of a detector assembly, and the detector assembly including a plurality of scintillator crystals enclosing the bore, the method comprising:
obtaining a plurality of reference sinograms acquired based on blank scan data corresponding to a first energy level, wherein the blank scan data originate from intrinsic background radiation of the plurality of scintillator crystals at a plurality of predetermined bed locations of the bed on which a nonradioactive phantom of a first weight is placed, each of the plurality of reference sinograms corresponding to one of the plurality of predetermined bed locations;
acquiring emission data of gamma photons of multiple energy levels originating from intrinsic background radiation and annihilation events associated with radioactivity of a patient on the bed; and
differentiating, from the acquired emission data of gamma photons of multiple energy levels, emission data relating to the intrinsic background radiation from emission data emitted by the patient;
generating a measured sinogram based on the differentiated emission data relating to the intrinsic background radiation; and
comparing the measured sinogram with the plurality of reference sinograms to determine a bed shift of the bed.

15. The method of claim 14, further comprising:
compensating the measured sinogram by removing scattering or random coincidence factors from the measured sinogram.

16. The method of claim 14, wherein the differentiating emission data relating to the intrinsic background radiation from emission data emitted by the patient is based on energy level and TOF timing.

17. The method of claim 14, the imaging system further including a computed tomography (CT) scanner, and the method further comprising:
generating a PET image based on the emission data relating to the radioactivity of the patient
obtaining a CT image related to the patient, the CT image is generated by using the CT scanner;
adjusting a mismatch between the CT image and the PET image, based on the determined bed shift; and
generating, based on the aligned CT image, an attenuation map for the PET image.

18. An imaging system, comprising:
a positron emission tomography (PET) scanner, the PET scanner including:
a detector assembly including a plurality of scintillator crystals;
a bed adapted to be accommodated in a bore enclosed by the plurality of scintillator crystals;
at least one storage medium including a set of instructions; and
at least one processor configured to communicate with the at least one storage medium, wherein when executing the set of instructions, the system is configured to:

obtain a plurality of reference sinograms acquired based on blank scan data corresponding to a first energy level, wherein the blank scan data originate from intrinsic background radiation of the plurality of scintillator crystals at a plurality of predetermined bed locations of the bed on which a nonradioactive phantom of a first weight is placed, each of the plurality of reference sinograms corresponding to one of the plurality of predetermined bed locations;

acquire emission data of gamma photons of multiple energy levels originating from intrinsic background radiation and annihilation events associated with radioactivity of a patient on the bed; and, differentiate, from the acquired emission data of gamma photons of multiple energy levels, emission data relating to the intrinsic background radiation from the radioactivity from the patient;

generate a measured sinogram based on the differentiated emission data relating to the intrinsic background radiation; and compare the measured sinogram with the plurality of reference sinogram to determine a bed shift of the bed.

19. The PET scanner system of claim 18, the system further comprising:
a computed tomography (CT) scanner;
a computer operationally coupled the PET scanner and the CT scanner, and the computer is configured to:
generate a PET image based on emission data relating to the radioactivity of the patient;
obtain a CT image related to the patient;
align the CT image with the PET image based on the determined bed shift to generate an aligned CT image; and
generate, based on the aligned CT image, an attenuation map for the PET image.

20. The PET scanner system of claim 19, the system is configured to:
generate an attenuation corrected PET image based on the attenuation map and the PET image.

* * * * *